United States Patent [19]
Houdard

[11] 4,066,881
[45] Jan. 3, 1978

[54] SAMPLED SIGNAL PROCESSING DEVICE

[75] Inventor: Jean-Pierre Houdard, St. Jean de la Ruelle, France

[73] Assignee: Compagnie Industrielle des Telecommunications Cit-Alcatel, Paris, France

[21] Appl. No.: 713,947

[22] Filed: Aug. 12, 1976

[30] Foreign Application Priority Data

Aug. 13, 1975 France ............................... 75.25231

[51] Int. Cl.[2] ............................................ G06F 15/34
[52] U.S. Cl. ..................................... 364/726; 364/724
[58] Field of Search ............... 235/152, 156; 324/77 B

[56] References Cited

U.S. PATENT DOCUMENTS

| | | | |
|---|---|---|---|
| 3,544,894 | 12/1970 | Hartwell et al. | 235/152 X |
| 3,704,826 | 12/1972 | Constantin | 235/156 |
| 3,952,186 | 4/1976 | Speiser et al. | 235/156 |

*Primary Examiner*—Jerry Smith
*Attorney, Agent, or Firm*—Sughrue, Rothwell, Mion, Zinn and Macpeak

[57] ABSTRACT

A device for performing the discrete Fourier transform on a sequence of an arbitrary number N of equally spaced signal samples. The device includes a digital filter having a transfer function:

$$H(z) = \frac{1 - e^{-2\pi j \frac{r}{N}} z^{-1}}{1 - 2(\cos \frac{2\pi r}{N})z^{-1} + z^{-2}} \text{ for } o \leq r < N$$

Calculation coefficients sin 2πr/N and cos 2πr/N depend on the value of N and are calculated using the same digital filter during a starting-up operation. The values of the coefficients are stored and the device is "primed" to a particular value of N. If a different number of samples N' is subsequently needed, a new priming pass sets the device up.

2 Claims, 1 Drawing Figure

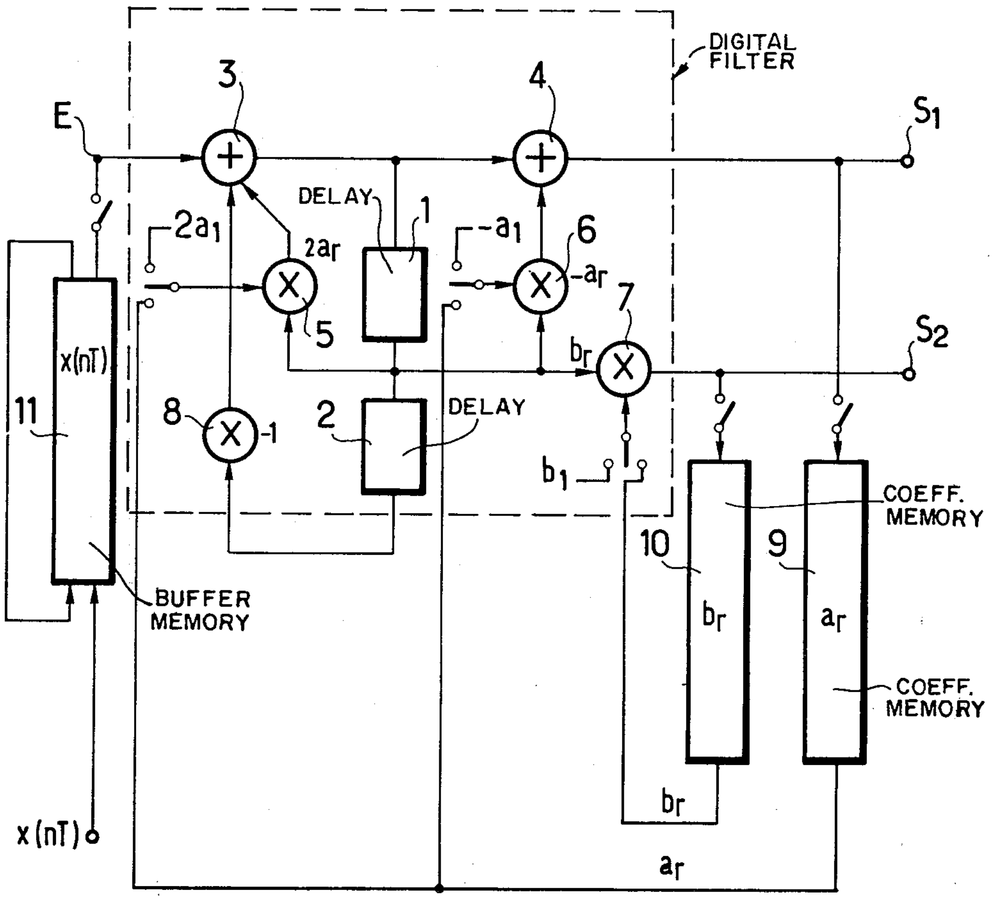
DIGITAL FILTER
E
3
4
S1
S2
DELAY
1
2a1
2ar
-a1
6
-ar
5
7
br
11
x(nT)
8
-1
2
DELAY
b1
COEFF. MEMORY
10
9
br
ar
BUFFER MEMORY
COEFF. MEMORY
x(nT)
br
ar

SAMPLED SIGNAL PROCESSING DEVICE

The present invention relates to a signal processing device. It concerns a device for computing spectral components of a signal by using the discrete Fourier on a sequence of samples of the signal.

The Fourier transform technique makes it possible to calculate N complex Fourier coefficients from N equally spaced samples of a function of time which is periodic or which has a limited duration.

A distribution of the spectral components in the frequency domain is derived corresponding to a distribution of the signal in the time domain. This relationship is expressed by the equation:

$$X_r = \sum_{n=o}^{N-1} x(nT)\, e^{-2\pi j \frac{rn}{N}} \tag{1}$$

where : $X_r$ is the coefficient of the r-th spectral component the spacing between the spectral components being 1/NT and $r$ assumes integer values 0 1, . . . N-1;

$x$(nT) is the n-th sample of the signal $x(t)$, $n$ assuming integer values 0, 1, 2 . . . N-1 and $j = \sqrt{-1}$.

Computation of a Fourier transform by conventional methods is long, since it requires a large number of complex operations. Practical techniques for rapid computation of the Fourier transform have been developed : two algorithms designated respectively as the Cooley-Tukey algorithm and as the Forman algorithm and programs based on these algorithms make it possible to carry out the various computing operations in reasonable time by means of a computer. The computing of the complex coefficients entails the use of programmed sine and cosine tables having finite dimensions. Once these tables are fixed, computation is only possible on signals comprising a fixed number of samples.

Theoretical studies for computation of the Fourier transform have also been developed. The Goertzel algorithm which corresponds to an approach using a digital filtering technique could be used to compute the complex Fourier coefficients. The book "Digital Processing of Signals" by Gold and Rader, published by MacGraw Hill, deals with the computing of discrete Fourier transforms, particularly by means of the Goertzel algorithm. This theory is discussed therein from page 171 onwards. This discussion shows that a digital filter, having a transfer function $$H(z) = \frac{1}{1 - e^{j\Omega Tk} z^{-1}},$$

with a single complex pole at $z = e^{j\Omega Tk}$, permits the computation of complex Fourier coefficients at a frequency of kΩwhere Ω = 2πr/NT rad/sec, (i.e. if the notation of formula(1) is considered, at a frequency of 2πr/NT; kΩ being equivalent to 2πr/NT). Such a filter, when excited by a sequence of samples $x$(nT), produces a sequence of output signal samples y(mT) at sampling instant mT, where:

$$y(mT) = \frac{1}{2\pi j} \oint \frac{z^m \sum_{n=o}^{N-1} x(nT) z^{-n}}{z - e^{j\Omega Tk}}\, dz$$

The sign $\oint$ designates an integral along a closed contour. The value of this integral is given by the residue at the pole $z = e^{-j\Omega Tk}$; and in particular, where $m$ = N, the equation is:

$$y(NT) = z^N \sum_{n=o}^{N-1} x(nT) z^{-n}$$

where: $z = e^{j\Omega Tk}$

Since $z^N = 1$ at the pole ($\Omega TN = 2\pi$; $e^{jk2\pi} = 1$; $1^N = 1$)

$$y(NT) = \sum_{n=o}^{N-1} x(nT) e^{-j\Omega Tkn} \tag{2}$$

This expression (2) is identical to the expression (1), taking into account that $$k\Omega = \frac{2\pi r}{NT}$$

and therefore represents that spectral component of the sequence of samples x(NT) which has a frequency 2πr/NT.

This same discussion also defines another filter whose transfer function is:

$$H(z) = \frac{1 - e^{-j\Omega Tk} z^{-1}}{1 - 2(\cos\Omega Tk) z^{-1} + z^{-2}} \tag{3}$$

having two poles at $z = z_1$ and $z = z_2$ where $z_1 = e^{j\Omega TK}$ and $z_2 = e^{-j\Omega Tk}$. Equation (3) is the same as $$H(z) = \frac{1}{1 - e^{j\Omega Tk} z^{-1}}$$

but rewritten in a form which allows the real and imaginary components to be separated.

Such a filter, when excited by the sequence of samples $x$(nT), produces a sequence of output signal samples $y$(mT) at sampling instants mT where:

$$y(mT) = \frac{1}{2\pi j} \oint \frac{z^m [\sum_{n=o}^{N-1} x(nT)] z^{-n} (z - e^{-j\Omega Tkn})}{z^2 - 2(\cos\Omega Tk) z + 1}\, dz$$

The value of this integral is given by the sum of the residues at the poles $z_1$ and $z_2$; in particular, where $m$ = N, this value is:

$$y(NT) = \sum_{n=o}^{N-1} x(nT)\, e^{-j\pi Tkn} \tag{4}$$

which provides the Fourier coefficients since the expression (4) is identical to the expression (1).

The calculations show that it would be possible to use a digital filter for computing a discrete Fourier transform, and that every $N^{th}$ output y(NT) of the digital filter discussed corresonds to a Fourier coefficient. FIG. 6—6 of digital processing of signals shows a theoretical filter whose transfer function is defined by the expression (3), using a real coefficient whose value is 2 cos ΩTk and a complex coefficient whose value is $-e^{-j\Omega Tk}$. This filter, having complex coefficients, would provide at its output, the N spectral components in a complex form, where $k$ assumes the values $k$ = 0, 1, 2 . . . N-1.

In a practical embodiment of the above-mentioned filter, the complex coefficients of the filter have to be represented by two real coefficients corresponding respectively to the real part $-\cos T\Omega k$ and to the imaginary part $\sin T\Omega k$, so that the filter has two outputs providing respectively the real and imaginary parts of each of the N spectral components. The use of this filter requires the use of programmed sine and cosine tables having finite dimensions for any particular number N of samples applied to the input of the filter. Such a filter using the Goertzel algorithm therefore suffers from the same drawback of inflexible sample lengths as computation using the Cooley-Tukey or forman algorithms.

The aim of the present invention is to remedy these drawback, i.e. to avoid the use of programmed sine and cosine tables and also to avoid the use of programmed calculation units while enabling the processing of N samples where N can be change from one processing operation to the next.

The present invention provides a device for performing the discrete Fourier transform on a sequence of an arbitrary number, N, of equally spaced samples x(nT) of a signal $x(t)$ to be processed, the device including a signal sample store for the N samples $x(nT)$ and a digital filter having transfer function H(z) from an input to a pair of outputs, where:

$$H(z) = \frac{1 - e^{-2\pi j \frac{r}{N}} z^{-1}}{1 - 2(\cos \frac{2\pi r}{N})z^{-1} + z^{-2}},$$

$$\cos \frac{2\pi r}{N} = a_r, \sin \frac{2\pi r}{N} = b_r$$

and $r$ is the order of the Fourier coefficient being calculated, the digital filter being such that application of the N samples in sequence at its input causes its outputs to produce respectively the real and imaginary components of the r-th Fourier coefficient, the device including a sine/cosine memory for storing values of $a_r$ and $b_r$ for different r, and the filter includes multiplier means connected to the sine/cosine memory to introduce the appropriate values of $a_r$ and $b_r$ into the filter during calculation, and switch means for putting the device into a setting up configuration in which the sine/cosine memory is connected to store successive values at the filter outputs for future use as values of $a_r$ and $b_r$ for successive $r$, the multiplier means is connected to an input for initial values $$a_1 = \cos \frac{2\pi}{N} \text{ and } b_1 = \sin \frac{2\pi}{N},$$

and the filter input is connected to receive a unit impulse function $u(rT)$ instead of the signal samples where $u(rT) = 1$ for $r = o$ and $o$ for $r \neq o$.

An embodiment of the present invention is described by way of example with reference to the single figure of the accompanying drawing which is a simplified flow diagram of a digital filter for performing the discrete Fourier transform on a sequence of samples.

The device shown in FIG. 1 is a two dimensional digital filter having a transfer function H(z) where:

$$H(z) = \frac{1 - e^{-2\pi j \frac{r}{N}} z^{-1}}{1 - 2(\cos \frac{2\pi r}{N})z^{-1} + z^{-2}} \text{ for } o \leqq r < N$$

This is thus a physical embodiment of the filter whose theory has been discussed in relation to equation (3) above.

The device has a signal sample input E which is switchable to receive signal samples $x(nT)$ from a sample buffer memory 11. This buffer memory 11 is a cyclic memory, which may be constituted by a looped shift register, since equal signal sample is presented once at the input E during the calculation of the Fourier coefficient of each spectral component. Means are provided (not shown) for setting the length of the buffer memory 11 to match the number, N, of samples which happen to be available for any one particular operation.

The device has two outputs $S_1$ and $S_2$. $S_1$ provides the real Fourier coefficients (the cosine series) while $S_2$ provides the imaginary Fourier coefficients (the sine series).

The core of the device comprises a digital filter which includes members 1 to 8 which operate in conjunction with two coefficient memories 9 and 10. The input E is connected to one input of a three-input adder 3 whose output is connected to the input of a first delay circuit 1. The output of the first delay circuit 1 is returned to a second input of the adder 3 via a first multiplier 5 and is also connected to the input of a second delay circuit 2. The output of the second delay circuit is similarly returned to an input of the adder via a second multiplier 8. The first multiplier 5 is switchable to multiply by a factor $2a_1$, where $a_1$ is an input supplied to the device or by a factor $2a_r$ where $a_r$ is the r-th coefficient stored in the memory 9. The second multiplier 8 multiplies by a factor $-1$ so that the output of the second delay circuit 2 is in effect subtracted from the sum of the other two input signals to the three-input adder 3. The delay circuits 1 and 2 have a delay period of one calculation step.

The output $S_1$ is provided by the output signal from a two-input adder 4 which sums the output of the three-input adder 3 with the output of the first delay line 1 after the latter output has passed through a third multiplier 6. The third multiplier is switchable to multiply by a factor $-a_1$ or $-a_r$ where $a_1$ and $a_r$ have the same significance as for the first multiplier 5.

The output $S_2$ is provided by the output of a fourth multiplier 7 which is switchable to multiply the output of the first delay line 1 by a factor $b_1$ or $b_r$ where $b_1$ is an input supplied to the device and $b_r$ is the $r$-th coefficient stored in the coefficient memory 10.

The coefficients $a_1$ and $b_1$ are cos $2\pi$/N and sin $2\pi$/N respectively while the coefficients $a_r$ and $b_r$ are cos $2\pi r$/N and sin $2\pi r$/N respectively.

The coefficient memories 9 and 10 have switchable inputs to store output signals appearing on outputs $S_1$ and $S_2$ respectively. The stored coefficients are used cyclically so the memories 9 and 10 can be in the form of looped shift registers or in the form of randomly addressable stores. In either case they are required to cycle through N coefficients during computation of any one complete set of Fourier coefficients and it is important that the cycle length, N, can be set to match the number of samples, N, that are available for processing, in a manner analagous to the sample memory 11.

The operation of device is divided into three phases: a first phase where the device is prepared for calculation using a particular value of N; a second phase where the device is put through one complete cycle of N steps to calculate the coefficients $a_r$ and $b_r$ (the coefficients appear sequentially at the outputs $S_1$ and $S_2$ and are stored in the memories 9 and 10 respectively); and a third phase where the device is put through one complete cycle of N steps to calculate each pair of Fourier coefficients. In other words if $r$ pairs of Fourier coefficients are required the device must operate for $r$ cycles of N steps each.

In detail the phases are as follows: First phase: for a fixed number N of signal samples to be processed, the values $a_1$ and $b_1$ are programmed. These values are:

$$a_1 = \cos \frac{2\pi}{N} \text{ and } b_1 = \sin \frac{2\pi}{N}$$

they are applied to the multipliers 5, 6 and 7. The memories 9, 10 and 11 are set to length N. Second phase: for the computing of the N pairs of filter coefficients $a_r$ and $b_r$, the filter is excited by a unit impulse u(t) shown by a sequence of N samples designated as $u(rT)$, applied to the input E of the filter (where $u(t) = 1$ at $t = o$ and is zero at all other times). The registers 1 and 2 are cleared, and the multiplier coefficients are set to $2a_1$, $-a_1$ and $b_1$ as appropriate. The device then steps through N operations producing the coefficients $a_r$ and $b_r$ at the outputs $S_1$ and $S_2$, which are connected to the memories 9 and 10.

This surprising and useful result stems from the trigonometrical identities:

$\cos n\theta = 2\cos(n-1)\theta, \cos\theta - \cos(n-2)\theta$, and $\sin n\theta = 2\sin(n-1)\theta, \cos\theta - \sin(n-2)\theta$ This can be seen as follows:

Call the output of the three input adder 3, W(rT), the output on $S_1$, A(rT), and the output on $S_2$, B(rT). The input on E is E (rT) and is equal to 0 for all $r$ except when $r = o$ then E(rT) = 1. (The unit impulse). In this phase each step of the calculation increments $r$ by one over a range $r = o$ to $r = N-1$.

Now:

$$A(r) = W(r) - a_1.W(r-1)$$

and $$W(r) = E(r) + 2a_1.W(r-1) - W(r-2)$$

the terms involving W can be eliminated to give:

$$A(r) = E(r) - a_1.E(r-1) + 2a_1.A(r-1) - A(r-2)$$

Similar working gives:

$$B(r) = b_1.E(r-1) + 2a_1.B(r-1) - B(r-2)$$

for $r \neq o$ $E(r) = o$ So these equations are both of the general form:

$$G(r) = 2\cos\theta G(r-1) - G(r-2)$$

and it can be easily verified that the starting conditions are right for $$A(r) = \cos \frac{2\pi r}{N} = a_r$$

-continued $$\text{and } B(r) = \sin \frac{2\pi r}{N} = b_r$$

The two sequences of coefficients $a_o$ to $a_{N-1}$ and $b_o$ to $b_{N-1}$ are stored in the memories 9 and 10. Third phase: calculation of the Fourier spectral coefficients of a sampled signal $x(t)$. The N samples $x(nT)$, $o \leqq n \leqq N-1$ of the signal $x(t)$ are stored in the memory 11. Choose a value $r$ for the order of the Fourier coefficients Xr sought and set the multipliers to multiply by $-a_r$, $2a_r$ and $b_r$ as appropriate. These values being taken from the memories 9 and 10 as calculated in the second phase. Clear the delay circuits 1 and 2 and step the device through N calculation steps presenting each sample $x(nT)$ to the input E in turn. The N-th outputs $S_1$ and $S_2$ are given by $$X_r = \sum_{n=o}^{N-1} x(nT)\, e^{-2\pi j \frac{rn}{N}}$$

Change the value of $r$ and repeat for as many Fourier coefficients as necessary. The usual process is to start with $r=o$ or 1 (depending on whether a DC component is of interest) and continue by incrementing $r$ for each cycle of calculation.

A single filtering device of order two is thus seen to be sufficient for calculating both the Fourier coefficients desired and the sine and cosine tables needed for the calculation based on an arbitrary number N of samples $x(nT)$. The value of N can be altered from one set of input data to the next with negligeable expense of calculation time and with no alteration of the circuitry of the device. The initial values of $$a_1 = \cos \frac{2\pi}{N} \text{ and } b_1 = \sin \frac{2\pi}{N}$$

may be inserted from an external source, may be calculated by means not shown or may be stored in a memory listing the results for values of N known to be useful in any particular application.

During the third phase the two-input adder 4 and the multipliers 6 and 7 may be rendered inoperative for all steps except the final step when $n = N-1$. In some embodiments this may increase speed and in any embodiment it suppresses the spurious results that would otherwise appear at the outputs $S_1$ and $S_2$ for all other n.

In a situation where it is known that only the cosine series of Fourier coefficients is of interest (eg where there is suitable a priori information about the phase of the signal $x(t)$) then the multiplier 7, the memory 10 and the output $S_2$ can be omitted.

What is claimed is:

1. A device for performing the discrete Fourier transform on a sequence of an arbitrary number, N, of equally spaced samples $x(nT)$ of a signal $x(t)$ to be processed, the device including a signal sample memory for the N samples x(nT), digital filter means having a transfer function H(z) with an input receiving samples from said memory to a pair of outputs, where:

$$H(z) = \frac{1 - e^{-2\pi j \frac{r}{N}} z^{-1}}{1 - 2(\cos \frac{2\pi r}{N})z^{-1} + z^{-2}},$$

and $$\cos\frac{2\pi r}{N} = a_r \sin\frac{2\pi r}{N} = b_r$$

and $r$ is the order of the Fourier coefficient being calculated, the digital filter being such that application of the N samples in sequence at its input causes its outputs to produce respectively the real and imaginary components of the $r$-th Fourier coefficient, the device further comprising a respective sine/cosine memory for storing values of $a_r$ and $b_r$ for different $r$, and the filter including multiplier means connected to respective sine/cosine memory to introduce the appropriate values of $a_r$ and $b_r$ into the filter during calculation, and switch means, coupled to said filter for putting the the device into a configuration in which a respective sine/cosine memory is connected to store successive values at the filter outputs for future use as values of $a_r$ and $b_r$ for successive $r$, the multiplier means connected to an input for initial values $$a_1 = \cos\frac{2\pi}{N} \text{ and } b_1 = \sin\frac{2\pi}{N},$$

and the filter input connected to receive a unit impulse function u(rT) instead of the signal samples, where $u(rT) = 1$ for R = o and $o$ for $r \neq$ o.

2. A device according to claim 1, wherein the digital filter comprises a three-input adder having a first input constituting the filter input, a delay circuit having two stages of unit delay connected in series to the output of the three-input adder, the output of the first stage of said delay circuit being returned to a second input of the three-input adder via a multiplier having a multiplying factor switchable between $2a_1$ and $2a_r$ and the output of the second stage being inverted and returned to the third input of the three-input adder; the first filter output being connected to the output of a two-input adder having a first input connected to the output of the three-input adder and a second input connected to the output of the first stage of the delay circuit via a multiplier having a multiplying factor switchable between $-a_1$ and $-a_r$; the second output being connected to the output of the first stage of the delay means via a mulipier having a multiplying factor switchable between $b_1$ and $b_r$.

* * * * *